Fig. 1

INVENTORS:
Robert J. Lee
Paul D. May

Fig. 2

INVENTORS:
Robert J. Lee
Paul D. May
BY
ATTORNEY

Fig. 3

INVENTORS:
Robert J. Lee
Paul D. May
BY
ATTORNEY

Patented Oct. 20, 1953

2,656,303

UNITED STATES PATENT OFFICE 2,656,303

REFINING HYDROCARBON RESINS

Robert J. Lee, La Marque, and Paul D. May, Galveston, Tex., assignors to Pan American Refining Corporation, Texas City, Tex., a corporation of Delaware Application February 17, 1950, Serial No. 144,612

7 Claims. (Cl. 196—39)

This invention relates to a process for refining hydrocarbon drying oils or resins of the type of the so-called "clay polymers" or Gray polymers, and more particularly to a process for the refining and decolorization of said drying oils by treatment with liquid, substantially anhydrous hydrogen fluoride.

In the thermal cracking of petroleum hydrocarbons at temperatures between about 850 and 1000° F., various gum-forming materials are produced, and must be removed in order to yield a product of satisfactory stability. This may be done in a variety of ways, one of the most satisfactory of which is the Gray process (U. S. P. 1,340,889, May 25, 1920; A. W. Cobb et al., Pet. Refiner 21, 12 (December 1942), pp. 447-450; V. A. Kalichevsky et al. "Chemical Refining of Petroleum," Chemical Catalog Company, Inc., 1933, pp. 210 and following). In this process, cracked hydrocarbons are passed in the vapor phase through a bed of an active solid, such as fuller's earth, at an elevated temperature, for example, above about 400° F. Under these conditions, the gum and color bodies are polymerized and a highly unsaturated polymer is produced on the clay. In a typical clay-treating installation, cracked gasoline vapors are passed through a tower containing a false bottom to support the clay charge. Such a tower having a 12-foot inside diameter and a height of 19.5 feet may contain 25 tons of 30–60 mesh clay, suitably a 50:50 mixture of Floridin clay and fuller's earth. The tower may be operated according to a cyclic procedure in which it is taken off stream periodically and the polymer is washed from the clay with a suitable solvent, such as gasoline, kerosene, light naphthas, aliphatic ethers, aromatic hydrocarbons, and the like. Preferably, however, the temperature and pressure within the clay tower are adjusted so that a partial condensation of heavier components of the gasoline vapors takes place therein. Under these conditions, the polymer tends to flow downward out of the clay, and the condensed hydrocarbons act as solvents to assist in the removal of the polymer from the clay. This technique makes continuous operations of the tower feasible; moreover it prolongs the activity of the clay at a high level. Under the most suitable conditions, the polymeric product is recovered as a 20 percent concentrate in the condensed hydrocarbons. The polymer may subsequently be isolated by stripping off the solvent, preferably under vacuum, with or without the use of steam or an inert gas.

Among the numerous catalysts suitable for producing clay polymer may be mentioned bone black, charcoal, activated carbon, bauxite, silica gel, magnesium silicate, kieselguhr, infusorial earth, diatomaceous earth, and various clays, such as fuller's earth and bentonite, which contain primarily aluminum silicates. As specific examples of such clays may be mentioned Florida earths, known by various names such as Floridin and Florex, and Attapulgus clay. The latter may advantageously be prepared as described in U. S. Patent 2,363,876.

In a typical application of the Gray process, cracked gasoline vapors are passed through a bed of 30 to 60 mesh Attapulgus or Floridin clay, comprising aluminum silicates, at a temperature of 425–450° F., a pressure of 200–300 pounds per square inch, gage, and a space velocity around 5 barrels per ton per hour. Under these conditions, polymerization of color and gum-forming components of the gasoline takes place and a highly unsaturated polymer is produced. The crude clay polymer emerging from the reaction unit is in a diluted form containing 80 to 85 percent of gasoline and kerosene boiling range material, which is stripped out, for example, with steam to give so-called "reduced" clay polymers, the properties of which vary, depending on the extent to which the low-boiling constituents are removed. The "reduced" clay polymers can be distilled to produce distillate polymers which we have treated by the process of the present invention.

The following range of properties are typical of a distillate polymer obtained by vacuum distillation of a reduced clay polymer.

| | |
|---|---:|
| Boiling range, ° F. @ 10 mm | 302–554 |
| Non-volatiles, per cent by wt | 80–85 |
| Viscosity at 100° F., SSU [a] | 700–1000 |
| Color, 2.25% in hexane, ASTM [b] | 3½ |
| Iodine number [c] | 200–225 |
| Specific gravity, 60/60° F | 0.975 |
| Average molecular weight [d] | 300–325 |

[a] Saybolt Universal seconds (ASTM, D–68–38).
[b] ASTM, D155–39T.
[c] Wijs, 0.5 hr., 200% excess.
[d] Menzies method.

Chemically, clay polymers are polycyclic polyolefins. Distillate clay polymers, for example, have been characterized (based on carbon-hydrogen, molecular weight, hydrogenation, refraction, dispersion and ultraviolet and infrared spectroscopic data) as tetracyclic triolefins. On the average, a typical sample of distillate clay polymer contains 3.85 rings and 2.8 olefinic double bonds per molecule, a few of the rings (about 1 out of 17) being aromatic rings and the remainder being alicyclic rings. The olefinic double bonds are present predominantly in the ring system and are mainly non-conjugated.

The polymers resulting from the Gray process in general have low volatility, high viscosity, and good drying properties, the latter resulting from their high iodine numbers, which are generally above about 150. Unfortunately, however, the polymers are very dark in color, and for this reason, despite their good drying properties, they have not been utilized to any substantial extent as components of surface-coating materials. In addition, crude clay polymers are penalized in commercial competition by a characteristic and undesirable odor.

Numerous attempts to improve the color of clay polymers have been made during the twenty-nine years that have elapsed since Gray first prepared them, but little success has been achieved. It has been observed, for example, that clay-treating the polymer in the liquid phase will give a product of light-red color. However, the life of the clay in this process is extremely low, being of the order of 1 to 2 barrels (42 gallons per barrel) of polymer per ton of clay, and for this reason the process is not economically feasible.

Attempts have also been made to decolorize clay polymers, whose color in the crude or as-produced state varies from black to dark green, by the selective polymerization of color bodies therein by the employment of various polymerization and refining agents such as concentrated sulfuric acid or aluminum chloride. Typically a crude clay polymer distillate is treated with about 40 pounds of 98 percent sulfuric acid per barrel of crude polymer, using 1:1 dilution with light naphtha. In order to produce refined polymers of 4½ ASTM color, it has been found necessary to subject the acid-refined polymer to clay treatment in operations which employ large amounts of clay, a clay life of only about 10 barrels of polymer per ton of clay being attainable. The yield of refined polymer by the sulfuric acid-clay refining process is of the order of 75 weight percent based on the polymer charged. Furthermore, treatment of the clay polymers with sulfuric acid frequently results in the production of emulsions, possibly due to the formation of oxidized and sulfonated derivatives of the polymer hydrocarbons, and these emulsions are quite difficult to separate. Finally, the sulfuric acid-clay refining process yields a product of undesirable odor.

The aluminum chloride refining process, likewise, requires a clay after-treatment to reduce the color of the polymers to the desired level and produces an aluminum chloride sludge from which it is uneconomical to recover the aluminum chloride. The aluminum chloride sludge, in fact, presents a refinery disposal problem; hence the treating costs are too high to be economical.

It is an object of this invention to provide a process for the treatment of synthetic hydrocarbon drying resins of the type of clay polymers to effect substantial refinement, decolorization and deodorization thereof. Another object of this invention is to provide a process for the hydrogen fluoride refining of synthetic hydrocarbon drying resins of the type of clay polymers, which process can be readily effected at ambient temperatures and atmospheric or moderate superatmospheric pressures. An additional object of this invention is to provide a one-step process for the refining of clay polymers which avoids the need of a clay percolation treatment. Yet another object of this invention is to provide a process for converting colored impurities in clay polymers to a normally solid resinous material having commercial utility. Still another object of this invention is to provide a process for converting synthetic hydrocarbon drying resins of the type of clay polymers to liquid drying resins characterized by low iodine number, light color and low odor level. These and other objects of our invention will become apparent from the ensuing description thereof.

The hydrogen fluoride treating process of the present invention converts synthetic hydrocarbon resins of the type of clay polymers to liquid drying resins which air-dry by oxidative polymerization to low molecular weight resinous films, the molecular weight of which is approximately double (500–600) the molecular weight of the original polymer. The resinous air-dried films are soluble in aromatic hydrocarbons and oxygenated solvents. It should be noted that true drying oils such as high unsaturated vegetable drying oils yield high molecular weight insoluble films upon air-drying.

We have made the surprising discovery that liquid, substantially anhydrous hydrogen fluoride can be successfully employed to refine, and especially to decolorize, unsaturated hydrocarbon drying resins of the type of clay polymers and that no further treatment, other than caustic washing, is required to produce a refined, salable, light-colored hydrocarbon drying resin. As is well known, and as the analytical data herein demonstrates, hydrocarbon drying resins of the type of clay polymers are highly unsaturated and it would be expected that such resins could not be refined by treatment with a strong polymerization catalyst such as substantially anhydrous hydrogen fluoride without converting substantially the whole of the resin to a resinous, solid or gelatinous material. Thus, it has been observed that the treatment of unsaturated vegetable drying oils such as oiticica, perilla or dehydrated castor oils with catalysts of the HF or $BF_3$ type results in the production of gels (U. S. Patent 2,418,921 of H. G. Berger, patented April 15, 1947). Likewise, it has been reported (Fredenhagen, Z. phys. chem. 164, 190 (1933)) that at room temperature and 30 minutes of contact with liquid hydrogen fluoride, a considerable number of vegetable drying oils or components (oleic acid, linseed oil, poppy seed oil, castor oil, sunflower oil and soy bean oil) reach a high stage of polymerization. Nevertheless, we have found that the color bodies in clay polymers can be selectively polymerized and extracted by liquid, substantially anhydrous hydrogen fluoride without either dissolving or significantly affecting the drying properties or the physical nature of the main body of said clay polymers.

The HF treating process of the present invention yields liquid drying resins having iodine numbers ranging between about 20 and about 150 cg. of iodine per g. of resin, Gardner colors ranging between about 12 and 18, ASTM colors below about 4½, and molecular weights between about 250 and about 300. The HF treating process results in substantial color and odor improvement of the crude polymer charging stock and, in part at least, appears to effect these results by selective dissolution and/or conversion of reactive polyolefinic hydrocarbons, including most of the conjugated diolefinic components, contained in the polymer charging stock. A very surprising feature of the inventive process is that the refined product, which has a very low maleic anhydride value and iodine number, dries set-totouch in about 5 to 8 hours when exposed to air in thin films. It has previously been thought that the drying of hydrocarbon drying resins was caused by high iodine number materials contained therein. As a consequence, refining processes for drying resins of the type of clay polymer which might result in drastic iodine number reduction were abjured. In a typical operation of the sulfuric acid-clay refining process mentioned above the iodine number of the refined polymer is about 185. Nonetheless, as the specific examples hereinafter show, we have found that an HF refined clay polymer having an iodine number of only 18 does not require substantially longer drying times than the sulfuric acid-clay refined polymer having the iodine number of 185.

Although it might be expected that hydrogen fluoride would react with the highly unsaturated hydrocarbons in clay polymers to produce fluorides, such as alkyl, alkenyl, or polyalkyl fluorides, we have made the surprising discovery that fluoride formation is surprisingly small or practically nonexistent under the conditions under which we have treated clay polymers with liquid substantially anhydrous hydrogen fluoride.

Briefly, the refining and decolorization process of the present invention comprises contacting polymers of the type of clay polymers, preferably, distillate fractions thereof, at temperatures between about 50 and about 100° F. under a pressure sufficient at least to maintain the liquid phase with liquid hydrogen fluoride, for example, the substantially anhydrous hydrogen fluoride of commerce. The amount of hydrogen fluoride, calculated as 100 percent HF, which we employ ranges from about 5 to about 40 weight percent, based on the polymer charging stock. The process of contacting is greatly facilitated by reducing the viscosity of the clay polymers to a desirable level by the addition of an inert solvent or diluent, for example, pentane, hexane, petroleum ether, solvent naphtha or the like in an amount between about 1 and about 4 volumes per volume of clay polymer. The period of contacting will necessarily vary with the extent of refining or decolorization sought to be effected, the intimacy and efficiency of contacting of HF and feed stock, the ratio of HF to feed stock, and the temperature. In general, if the treatment is carried out with good stirring, contacting periods between about 1 and about 60 minutes may be employed, preferably between about 25 and about 50 minutes.

Following the contacting, which may be effected by conventional means, the contacting mixture is allowed to settle, or may be centrifuged to save time, to separate, respectively, (a) a layer in which liquid hydrogen fluoride is the external or heavier phase, which layer contains polymerized color bodies and (b) a layer of refined, unsaturated synthetic hydrocarbon drying resin dissolved in the solvent or diluent which was used to improve contacting. In batch type separation of the two phases, for example in a conical bottom agitator vessel, it is difficult to detect the interface between the phases, especially when the amount of diluent hydrocarbon is in the range of 2 volumes per volume of clay polymer or less. In this case, detection of the interface is advantageously accomplished with the aid of an electrical conductivity meter. The hydrocarbon drying resin layer may be washed with water and aqueous sodium hydroxide, and thereafter the solvent or diluent may be distilled or stripped therefrom for recycle to the process leaving a refined hydrocarbon drying resin of greatly enhanced commercial utility and value, which may be distilled under vacuum or with steam to produce fractions of desired viscosity. The hydrogen fluoride layer may be distilled or stripped to separate hydrogen fluoride therefrom, leaving a dark solid resin which, as will be pointed out hereinafter, has commercial utility.

By the process of the present invention it is readily possible to convert crude clay polymers whose color normally ranges from black to dark green, to refined liquid drying resins of amber to red color which may be readily employed in ink oils, paint formulations, etc.

The refining agent employed in the present process is liquid hydrogen fluoride containing not more than about 5 percent of water, for example, commercial liquid anhydrous hydrogen fluoride. We have found, as shown in certain examples herein, that aqueous hydrogen fluoride (for example aqueous hydrogen fluoride of 80% concentration) is not nearly as effective as substantially anhydrous hydrogen fluoride and cannot be substituted therefor in the process of the present invention to effect the refining and decolorization of synthetic hydrocarbon drying resins of the type of clay polymers. Although we may employ between about 5 and about 50 weight percent of HF, we ordinarily employ between about 10 and about 30 weight percent of HF, preferably about 25 weight percent of HF, based on the polymer charging stock.

The efficiency of contacting of the hydrocarbon drying resin and liquid hydrogen fluoride is greatly increased by dissolving or diluting the drying resin with an inert solvent, for example, saturated aliphatic and naphthenic hydrocarbons and their halogenated derivatives in general, and mixtures thereof, e. g. pentanes, hexanes, heptanes, octanes, nonanes, decanes and the like; or cyclopentane, methylcyclopentane, cyclohexane, methylcyclohexane and the like; hydrocarbon mixtures such as petroleum ether, naphtha or naphtha fractions; chloroform, carbon tetrachloride, propyl bromide or other inert halogenated solvents.

The contacting of liquid hydrogen fluoride and the crude hydrocarbon drying oil may be effected by conventional means; for example, by mechanical agitators, venturis, knot-hole or other orifice mixing devices, by concurrent or countercurrent contact of refining agent and oil in a packed vessel wherein the hydrocarbon phase is the continuous phase, etc. as is well known in the art of selective solvent refining of lubricating and illuminating oils. Temperature control during the contacting operation may be effected by conventional means such as direct or indirect heat exchange. It will be understood that the process of this invention may be effected batchwise, semicontinuously or continuously, and that extract and raffinate recycle to the contacting step may be employed.

Although temperatures between about 50° F. and about 150° F. may be employed in practicing the present process, temperatures between about 50° F. and about 100° F. are usually employed, temperatures in the range of about 70 to about 90° F. being preferred. The examples which follow illustrate the effect of treating temperatures upon the results of the present process.

Following the contacting operation, the contracting mixture is allowed to stratify by gravity, or under the acceleration produced by a centrifuge, into a layer of refined synthetic hydrocarbon drying resin and a layer comprising predominantly liquid hydrogen fluoride containing dissolved and/or converted color bodies derived from the crude drying oil.

The process of the present invention is illustrated by the specific examples set forth below. The crude clay polymer charge stock employed in the examples was a distillate fraction produced by continuous flash distillation of total clay polymer at atmospheric pressure using steam as an additional stripping aid. In this distillation all possible volatile material is distilled overhead, leaving a resinous residue of 200–210° F. softening point as determined by the ring and ball method (ASTM Method D36–26). The total distillate is then stripped of the lighter gasoline and kerosene components to give a "crude clay polymer distillate" having the following properties.

*Crude clay polymer distillate employed as charge stock in the examples*

Boiling range _______ 200–570° F. at 10 mm. Hg.
475° F. I. B. P. at atm. pressure.
552° F. 5% at atm. pressure.
566° F. 10% at atm. pressure.
Specific gravity, 60° F./60° F. _______ 0.976.
Iodine number (Wijs) _______ 206 cg. I₂ per gm. sample.
Maleic anhydride value _______ 55 mg. maleic anhydride per gram of sample.
Viscosity, Saybolt Universal Method (ASTM D88–44) _______ 1014 seconds at 100° F.
Color _______ Dark greenish-black.
Color of 2.25 vol. percent solution in kerosene (ASTM D155–45T) _______ 3½.
Molecular weight _______ 311.

Attention is directed to the dark greenish-black color of this material which renders it unsuitable for use in paints, ink oils and protective coatings, even though it possesses good drying properties.

In the process of the examples, contacting was effected in an autoclave provided with a 1725 R. P. M. mechanical stirrer or, in some instances, in a shaking bomb.

Following is a tabulation of specific examples of the HF treating process of the present invention.

TABLE 1

*HF refining of crude clay polymer distillate*

[Temperature of treating = 85–90° F.]

| | Charged | | | | HF, wt. percent on crude polymer | Dilution, paraffin Hydrocarbon to polymer, vol. | Stirring | | Recovered products | | | |
|---|---|---|---|---|---|---|---|---|---|---|---|---|
| Ex. | Crude clay polymer, g. | Diluent, mls. | HF, g. | H₂O, g. | | | Speed, R. P. M. | Time, min. | Total HF layer, g. | Refined clay Polymer | | Total losses | |
| | | | | | | | | | | g. | Wt. percent of charge | g. | Wt. percent |
| 1 | 100 | 500 H | 5 | | 5 | 5:1 | In shaking reactor | 30 | | | 90 | | |
| 2 | 100 | 500 H | 10 | | 10 | 5:1 | | 30 | | | 73 | | |
| 3 | 225 | 450 | 34 | | 15.1 | 2:1 | 800 | 45 | 66 | 183 | 81.3 | 10 | 3.9 |
| 4 | 225 | 900 | 34 | | 15.1 | 4:1 | 800 | 45 | 87 | 166 | 73.8 | 6 | 2.3 |
| 5 | 225 | 900 | 34 | | 15.1 | 4:1 | 1,725 | 45 | 45 | 180 | 80.0 | 0 | 0 |
| 6 | 200 | 800 H | 30 | | 15 | 4:1 | In shaking reactor | 30 | | | 72 | | |
| 7 | 100 | 500 H | 15 | | 15 | 5:1 | | 30 | | | 75 | | |
| 8 | 225 | 900 | 45 | | 20.0 | 4:1 | 1,725 | 5 | 100 | 162 | 72.0 | 8 | 3.3 |
| 9 | 225 | 900 | 45 | | 20.0 | 4:1 | 1,725 | 45 | 113 | 157 | 69.8 | 0 | 0 |
| 10 | 225 | 900 | 45 | | 20.0 | 4:1 | 1,725 | 45 | | | | | |
| 11 | 225 | 450 | 56 | | 24.9 | 2:1 | 1,725 | 45 | 134.5 | 124.5 | 55.0 | 22 | 7.8 |
| 12 | 225 | 900 | 56 | | 24.9 | 4:1 | 1,725 | 45 | 143 | 140 | 62.2 | 0 | 0 |
| 13 | 225 | 900 | 115 | | 51.0 | 4:1 | 800 | 45 | 155 | 95 | 42.2 | 90 | 26.6 |
| 14 | 300 | 1,200 | 80 | 20 | 26.6 | 4:1 | 800 | 45 | 140 | 241 | 80.3 | 19 | 4.7 |
| 15 | 225 | 900 | 50 | 50 | 22.2 | 4:1 | 800 | 45 | 97.6 | 215 | 95.6 | 12.5 | 3.8 |

| Ex. | Characteristics of the refined clay polymer | | | | | | |
|---|---|---|---|---|---|---|---|
| | Color, Gardner [1] | Color, ASTM [2] | I₂ No. [4] | MAV | Mol. weight [3] | Specific gravity, 60/60° F. | R. I., 20° C. |
| 1 | 18 | | | | | | |
| 2 | 16–17 | | | | | | |
| 3 | 15½ | 7 | 136 | 6 | 263 | 0.9465 | 1.5260 |
| 4 | 14¾ | 6 | 121 | 3 | 286 | .9459 | 1.5255 |
| 5 | 14¾ | 6 | | | | | |
| 6 | 14 | | | | | | |
| 7 | 15 | | | | | | |
| 8 | 14 | 4¾ | 118 | 0 | 298 | .9712 | 1.5341 |
| 9 | 12 | 4¼ | 82 | 3 | 297 | .9465 | 1.5245 |
| 10 | 12 | 4 | 78 | | | .945 | 1.5259 |
| 11 | 12 | 4 | | | | | |
| 12 | 12 | 4 | 55 | 4 | 298 | .9561 | 1.5259 |
| 13 | 11 | 3½ | 18 | 11 | 299 | | 1.5260 |
| 14 | 7 | 7 | | | | | |
| 15 | Black | | | | | | |

H = hexane; pentane diluent used in other examples.
[1] By comparison with 1933 Gardner color standards.
[2] ASTM Procedure D155–45T.
[3] Menzies method.
[4] Procedure of Hoffman and Green—"Oil and Soap," vol. 16, p. 236 (1939).

Figure 1:
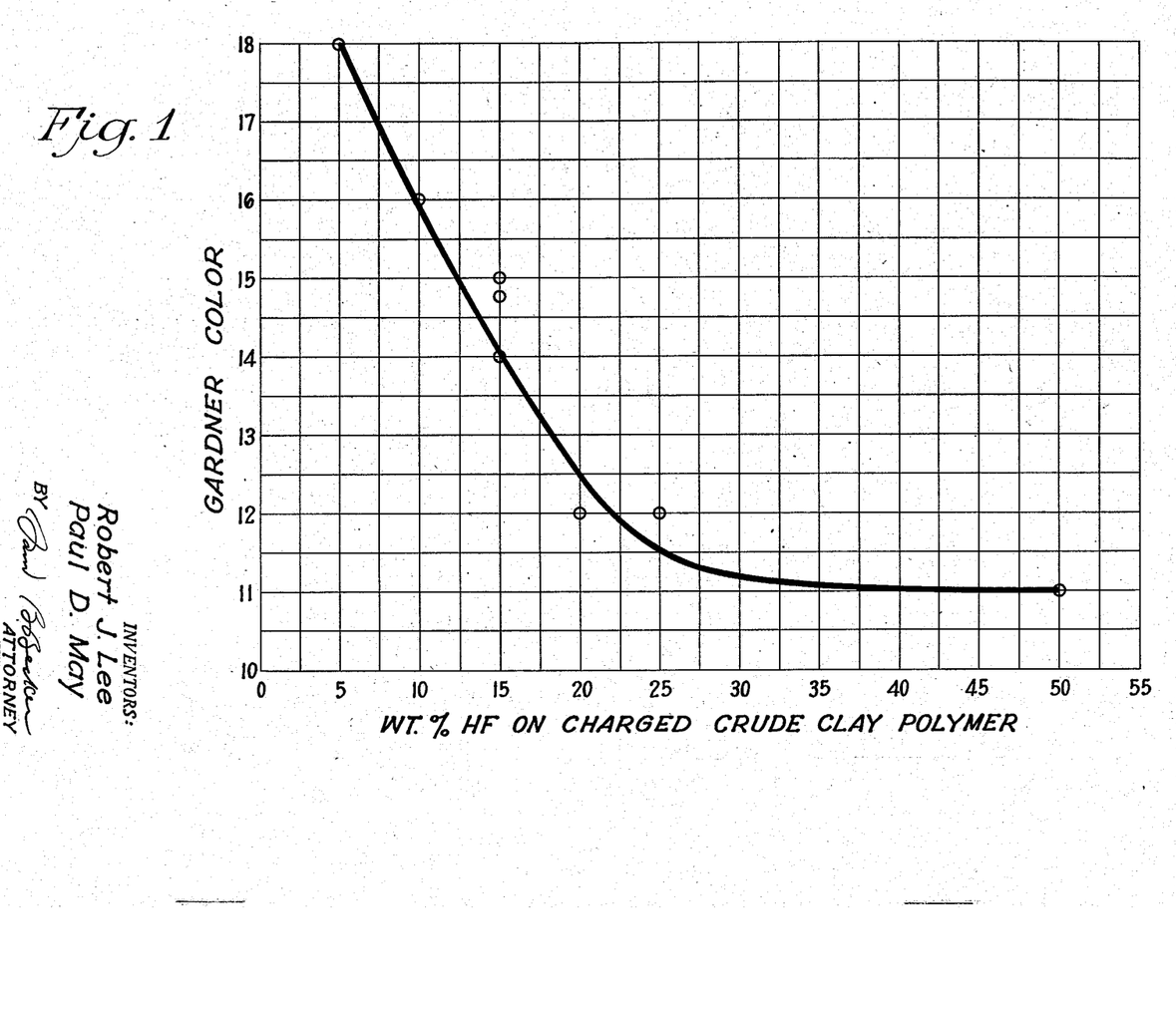
Figure 2:
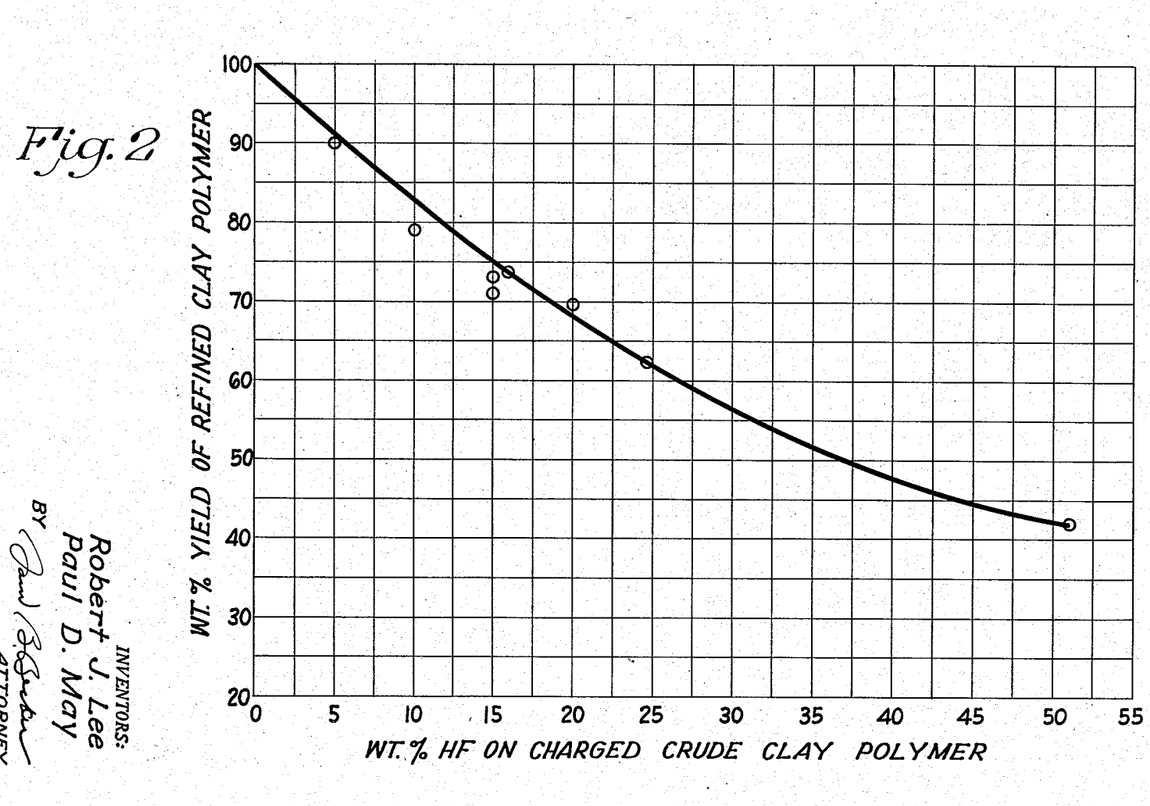
Figure 3:
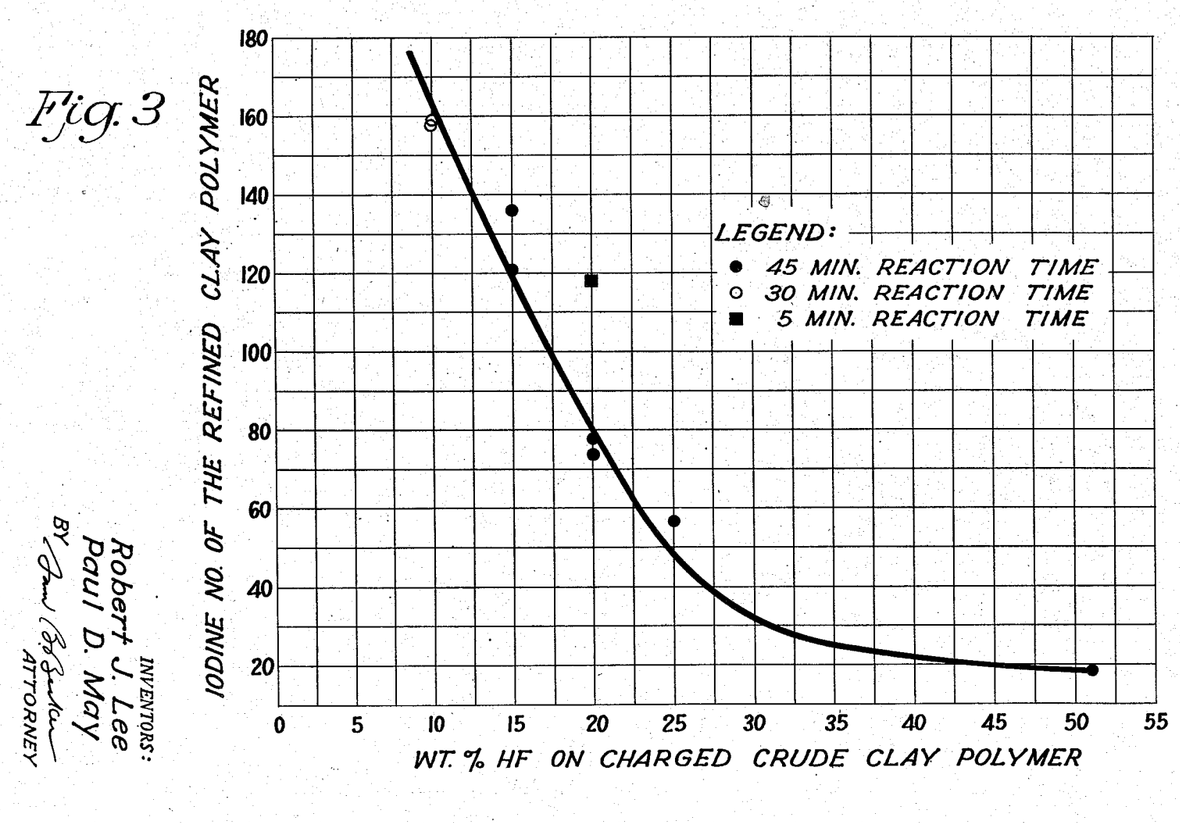

It will be noted from the data presented in Table 1 that the yield of refined drying resin decreases almost linearly with increasing amounts of hydrogen fluoride in the range of about 5 to 50 weight percent, based on the crude polymer charged (Figure 2). However, the color improvement of the refined resin increases sharply and almost linearly with increases in HF in the range of about 5 to 25 percent, whereafter little or no increase in color improvement is obtained with increasing amounts of HF (Figure 1). The iodine numbers of the refined drying resins, like the color, decrease sharply and almost linearly with increasing amounts of HF in the range of about 5 to about 25 weight percent, based on the crude polymer charged, and thereafter decreases less rapidly (Figure 3). It will be apparent therefore, that treatment of a crude drying resin such as a clay polymer distillate with between about 10 and about 25 weight percent of HF yields refined products whose Gardner colors range between about 16 and about 12, the iodine number decreasing from about 160 to about 50 with increasing severity of HF treatment in the range of 10-25 weight percent. However, increasing the severity of HF treatment to about 50 weight percent of HF based on polymer charged yields drying resins having extremely low iodine numbers of the order of only 20.

The iodine numbers, reported in Table 1 and Figure 3 for the HF treated drying resins, were determined by a three-minute, mercuric acetate catalyzed modification of the Wijs procedure, using 200% excess Wijs reagent, described by Hoffmann and Green, Oil and Soap, vol. 16, p. 236 (1939). The iodine numbers were also determined on several samples of the refined resin by Official Method Cd1-25 of the American Oil Chemists' Society (1946), using 200% excess of Wijs reagent and 30 minutes reaction time. The latter method is generally applied to vegetable drying oils and generally gives slightly higher iodine values. By this method the HF refined drying resins, produced as in Examples 9, 10 and 12 of Table 1, showed iodine numbers of 102, 93, and 78 as compared with 74, 78 and 57 by the three-minute catalyzed procedure. In general the iodine numbers were approximately 20 units higher by the A. O. C. S. procedure.

The iodine number procedures do not measure the true unsaturation of the HF refined drying resins, since it is known that the true unsaturation of some polycyclic polyolefin mixtures, as measured by hydrogenation, differs considerably from the degree of unsaturation calculated from iodine number data. In spite of this recognized limitation, hydrocarbon drying resins and oils are generally sold and classified on the basis of an iodine number specification. Iodine number data are also important in controlling the refining operations involved in the production of these resins, as for example the HF refined resins of the present invention.

The true unsaturation, i. e., the actual number of olefinic double bonds per molecule, of the HF refined resins produced by the process of this invention is considerably greater than indicated by the iodine number data recorded in Table 1. It has also been shown that these resins possess sufficient unsaturation to air-dry rapidly on exposure to air in thin films. However, the low degree of reactivity with iodine monochloride (Wijs reagent) of the HF refined drying resins is a significant property in utilization of these resins in the protective coatings industry in applications wherein resins of low reactivity are desired, such as in the manufacture of ink oils, floor coverings and the like. Moreover, although the reason for the low iodine numbers of the HF refined resins is not known, there is a significant difference in the refining action of hydrogen fluoride as compared with sulfuric acid, aluminum chloride and other agents which do not greatly reduce the iodine number of the resin in the refining process. Because of this difference, the low iodine number HF-refined resins are believed to have important differences in chemical structure which are believed to be important in the utilization and performance of these resins.

In Example 15, wherein 22.2 weight percent of HF (calculated as 100 percent HF) was employed as a 50 percent aqueous solution, no decolorization was obtained and the product was black. In Example 14, 26.6 weight percent of HF (calculated as 100 percent HF) based on the crude polymer, was employed as an 80% aqueous solution yielding a product of 17 Gardner color and 7 ASTM color. However, if the same amount of HF is employed in the anhydrous form (note Examples 11 and 12), a much greater degree of decolorization is realized, a product of 12 Gardner color and 4 ASTM color being obtained. It would thus appear that small amounts of water of the order of about 1 to 5 weight percent in the hydrogen fluoride treating agent would not be particularly harmful, but that larger amounts of water result in a gradual decrease in the decolorization ability of HF.

The data in Table 1 indicate that diolefins are substantially completely removed from the crude polymer, since the MAV of the refined drying resins is generally below 5. It thus appears, unexpectedly, that a high degree of unsaturation is not necessary to obtain drying properties in these drying resins and that the more highly unsaturated materials contained in the crude resins are actually detrimental in the sense that they are dark colored and odoriferous materials.

The following table indicates the effects of treating temperatures upon the present treating process.

TABLE 2

Effect of temperature on decolorization of clay polymer distillate by HF treating

| Ex. | Temp., °F. | Reaction time, minutes | Hexane, mls. | Crude polymer charge, grams | HF used, grams | Wt. percent HF | Gardner color of refined polymer |
|---|---|---|---|---|---|---|---|
| 16 | 50 | 30 | 400 | 200 | 30 | 15 | 14 |
| 17 | 86 | 30 | 800 | 200 | 30 | 15 | 14 |
| 18 | 160 | 30 | 800 | 400 | 60 | 15 | 18+ |
| 19 | 120 | 45 | 900 | 225 | 45 | 20 | 14 |
| 10 | 85-90 | 45 | 900 | 225 | 45 | 20 | 12 |

The effect of temperature within the range of 50°-160° F. is shown in Table 2. Comparing Examples 16 and 17, it is seen that there is no advantage to operating at 50° F. as compared with 86° F.; whereas in Example 18 at 160° F. the color of the refined product was substantially darker— i. e., 18+ Gardner compared with 14 Gardner for treats using 15% HF. A comparison of Examples 10 and 19, using 20% HF at 90° and 120° F., respectively, discloses that slightly better results are obtained at 90° F.—i. e., 12 Gardner vs. 14 Gardner. These data indicate that there is a gradual darkening of color as the treating temperature is increased above about 90° F.

We have found that the hydrogen fluoride extract layer can be stripped with a slow current of gas at 200 to 350° F. to vaporize hydrogen fluoride which may be fractionally condensed and recycled to the process. A typical stripping time is 1 to 4 hours. The stripped extract is a black resin having a softening point of 150–250° F. (Ring and ball.) The concentration of free HF in the extract can be reduced and the softening point increased, if desired, by using higher stripping temperatures and longer stripping times.

In our refining operations on clay polymers with liquid hydrogen fluoride we have found that there is only a trace amount of hydrogen fluoride in the refined synthetic hydrocarbon drying oil layer which is separated from the hydrogen fluoride extract layer. Usually, therefore, it is sufficient merely to wash the raffinate layer with water and/or, if desired, to subject it to fractional distillation under reduced pressure, for example 0.1 to 10 mm. of mercury, to produce fractions of desired viscosity. However, in commercial operations some hydrogen fluoride may be mechanically occluded in the raffinate layer due to imperfect phase separations and, in this event, the hydrogen fluoride can be removed by means known in the art, e. g., by treatment with aqueous alkalies such as NaOH, or by contacting the raffinate with solid caustic, bauxite or other basic solids.

Table 3 presents comparative drying time data for HF-refined clay polymer distillates. In each case, the polymer was mixed with 0.1% cobalt and 0.5% lead drier, in the form of the naphthenates, and films of approximately 0.001 inch wet film thickness were spread on glass plates. No thinner was added to the polymer. The "set-to-touch time" was the time in hours required for the film to "set" to the point that no film material would be removed by gently brushing the surface with one's finger. The "drying time" reported in Table 3 was the time in hours required for the film to become converted to a firm resinous condition, such that no mark would be left on the film when touched lightly with one's finger. It should be noted that air-dried films of hydrocarbon drying resins, derived from clay polymer and similar products, characteristically are thermoplastic in nature and retain a slight residual tackiness for several days. This behavior is typical of clay polymer products refined by either sulfuric acid and clay treatment or by the HF treating process of this invention. After the film has dried to a firm condition, it slowly hardens and gradually loses its slightly tacky nature during the next several days. Because of this characteristic it is not possible to define the drying time of these synthetic liquid drying resins with any degree of exactitude in terms of the conventional "print-free time" or "tack-free time" methods which are generally applied to films from vegetable drying oils and varnishes. However, the data in Table 3 give a roughly quantitative picture of the comparative drying times of the HF treated products and other clay polymer samples.

TABLE 3

| Polymer source, Example No. | Wt. percent of HF used in refining | $I_2$ No. of the refined polymer | Set-to-touch time (hrs.) | Drying time (hrs.) |
|---|---|---|---|---|
| 4 | 15 | 121 | 5 –5.5 | 20 |
| 9 | 20 | 78 | 6.5 –7.0 | 24 |
| 12 | 24.8 | 57 | 7.0 –7.5 | 25 |
| 13 | 51 | 18 | 7.5 –8.0 | 26 |
| Sulfuric acid + clay treated polymer [1] | | 185 | 4.75–5.25 | 22 |
| Crude unrefined clay polymer distillate | | 206 | 4.5 –5.0 | 24 |

[1] Polymer which had been treated with 40 lbs. of 98% sulfuric acid per barrel and clay treated to a clay life of approx. 15 barrels of polymer per ton of Attapulgus clay.

From the data in Table 3, it will be noted that there is a trend toward a slightly longer drying time for the lower iodine number samples; however, the differences are not great. The drying time of the HF treated samples is about the same or slightly longer than for a clay polymer which has been refined by sulfuric acid and clay treating to a comparable color level. It should be pointed out that the film thickness employed for the drying time studies has a very marked effect on the observed drying time so that it is difficult to obtain accurate, comparable values. Some of the drying time differences reported in Table 3 may not be real and may only reflect slight but unavoidable differences in the film thicknesses of the samples.

In order to study the color stability of the HF-treated polymers, a sample of the polymer was placed in a Gardner tube (approx. ½ inch by 4½ inches) and heated in an oven at 100° C. The color of the polymer was then redetermined after 24 hours of heating and after longer periods as indicated in the table below. Unstable samples will turn dark—i. e., become darker than the darkest Gardner color standard, #18, or in some cases become practically black—after 24 hours or less. The following results (Table 4) are indicative of good color stability.

TABLE 4

Color stability of HF refined polymer

| Sample | Original color, Gardner | Gardner color after aging at 100° C. | | |
|---|---|---|---|---|
| | | After 24 hrs. | After 48 hrs. | After 116 hrs. |
| HF refined polymer (Example 10; 20% HF treat followed by washing with 10 w.% NaOH) | 12 | 13 | 14 | |
| HF refined polymer | 16 | 17 | 17 | 17 |
| Sulfuric acid and clay treated polymer [1] | 14 | 15 | 15 | 15½ |

[1] Crude polymer distillate treated with 40 lbs. $H_2SO_4$ per barrel and treated with Attapulgus clay to clay life of 10–15 barrels of polymer per ton of clay.

The data in Table 4 show that HF refined drying resins have good color stability and that the stability is equivalent to the stability of the sulfuric acid-clay refined resin.

In order to provide some insight into the nature of the material which is removed in solution in liquid hydrogen fluoride by the present treating process, the following illustrative example is presented.

EXAMPLE 20

Crude clay polymer distillate (600 cc. or 577 gms.) was dissolved in 2400 cc. of pentane and this mixture was charged to a 1-gallon capacity autoclave provided with a propeller type agitator. The remainder of the charge consisted of 90 gms. of anhydrous HF which is equivalent to 15.6 wt. percent based on crude clay polymer distillate. The temperature was adjusted to 86° F. and the mixture was agitated at 1725 R. P. M. for a period of 45 minutes. No external heating or cooling was required to maintain the temperature and no significant temperature change occurred during the run. At the conclusion of the stirring period, the contents of the autoclave were allowed to settle for 10 minutes. A sample of the upper or hydrocarbon layer, containing the decolorized polymer in pentane solution, was withdrawn through a draw-off tube inserted through the top flange of the autoclave. Only a small sample was withdrawn by this means in order to obtain reliable data on the color and other properties of the refined polymer. This procedure was followed in order to insure that no contamination of the refined polymer phase by the dark lower HF phase would occur to cause erroneous results. The remainder of the contents of the reactor were withdrawn through the bottom and the lower HF phase was separated as carefully as possible from the hydrocarbon phase containing the polymer. The hydrocarbon phase was neutralized and water washed, whereafter the pentane diluent was stripped off leaving the refined clay polymer product. The following data summarize the yield and pertinent properties of this sample.

Yield of refined clay polymer __ 71 weight percent.
Gardner color _______________ 14–.
I₂ No _______________________ 101.

The HF phase, separated as described above, was slowly gas stripped at 325–250° F. for 3½ hours in order to remove the HF and to recover the resinous product present in this phase. The recovered resin had the following characteristics:

Yield of resinous product from
  HF phase _________________ 26 weight percent.
Molecular weight _____________ 696.
Iodine number _______________ 183.
Softening point (ring and ball
  method) __________________ 232° F.
Free HF _____________________ 0.1%.
Fluorine content _____________ 2.17%.
Solubility in CCl₄ ____________ Soluble.
Solubility in benzene _________ Soluble.
Solubility in linseed oil _______ Soluble and compatible.

The fluorine content of the resin could be reduced further by additional stripping at a higher temperature. The resinous product described above is useful in the preparation of core oils and low cost protective coatings. This material can also be blended with reduced clay polymers to produce protective coatings, etc.

It will be apparent from the foregoing that we have accomplished the object of our invention. There is a substantial commercial demand for low iodine number (about 75 or less) drying resins which can be satisfied by operation of the present process. Low iodine number drying resins are of value in the protective coating field, for example in the manufacture of floor covering. The refined drying resins produced by the present process are also applicable in the preparation of ink oils, core oils, water emulsion paints and low cost enamels.

Having thus described our invention, what we claim is:

1. A process for refining a clay polymer drying resin produced by the selective polymerization of the color and gum-forming constituents of a cracked naphtha, which process comprises contacting said resin with liquid, substantially anhydrous hydrogen fluoride in an amount between about 10 and about 50 percent by weight, based on said resin, at a temperature between about 50 and about 150° F. under pressure sufficient to maintain the liquid phase and thereafter separating a layer of refined hydrocarbon drying resin which is insoluble in liquid hydrogen fluoride and a layer of liquid hydrogen fluoride containing colored impurities, said refined hydrocarbon drying resin containing substantially no conjugated double bonds as indicated by its maleic anhydride value.

2. A process for refining a clay polymer drying resin produced by the selective polymerization of the color and gum-forming constituents of a cracked naphtha, which process comprises contacting said resin with liquid, substantially anhydrous hydrogen fluoride in an amount between about 10 and about 30 percent by weight, based on said resin, at a temperature between about 50 and about 100° F. under pressure sufficient to maintain the liquid phase and thereafter separating a layer of refined hydrocarbon drying resin which is insoluble in liquid hydrogen fluoride and a layer of liquid hydrogen fluoride containing colored impurities, said refined hydrocarbon drying resin having a maleic anhydride value not substantially above 10 milligrams of maleic anhydride per gram of said refined hydrocarbon drying resin.

3. A process for refining a clay polymer drying resin produced by the selective polymerization of the color and gum-forming constituents of a cracked naphtha, which process comprises contacting said resin with liquid, substantially anhydrous hydrogen fluoride in the amount of about 25 percent by weight, based on said resin, at a temperature between about 70 and about 90° F. under pressure sufficient to maintain the liquid phase and thereafter separating a layer of refined hydrocarbon drying resin which is insoluble in liquid hydrogen fluoride and a layer of liquid hydrogen fluoride containing colored impurities, said refined hydrocarbon drying resin having a maleic anhydride value not substantially above 10 milligrams of maleic anhydride per gram of said refined hydrocarbon drying resin.

4. A process for decolorizing a clay polymer drying resin having an iodine number between about 150 and about 250, a maleic anhydride value between about 5 and about 60 and an average molecular weight between about 200 and about 400, which process comprises contacting said clay polymer drying resin with liquid, substantially anhydrous hydrogen fluoride in an amount between about 10 and about 50 percent by weight, based on said clay polymer drying resin, at a temperature between about 50° F. and about 150° F. under a pressure sufficient to maintain the liquid phase, for a period of time sufficient to effect substantial decolorization of said clay polymer drying resin, and thereafter separating from the contacting mixture a layer of refined HF-insoluble clay polymer drying resin having a relatively light color not in excess of 5 on the ASTM scale, a maleic anhydride value not substantially above 10 and an iodine number between about 20 and about 150, and separating from the contacting mixture an extract layer comprising liquid hydrogen fluoride and color bodies derived from the clay polymer drying resin.

5. The process of claim 4 in which said contacting is effected in the presence of about 1 to about 4 volumes of a saturated hydrocarbon solvent per volume of said clay polymer drying resin.

6. The process of claim 4 in which the amount of liquid, substantially anhydrous hydrogen fluoride is between about 10 percent and about 30 percent by weight, based on said clay polymer drying resin.

7. The process of claim 6 wherein the temperature of said contacting is between about 50° F. and about 100° F.

ROBERT J. LEE.
PAUL D. MAY.

References Cited in the file of this patent

UNITED STATES PATENTS

| Number | Name | Date |
| --- | --- | --- |
| 2,076,581 | Kharasch | Apr. 13, 1937 |
| 2,505,148 | Schneider | Apr. 25, 1950 |
| 2,559,083 | May | July 3, 1951 |
| 2,582,434 | Hoffman | Jan. 15, 1952 |